June 21, 1955 R. DALLY 2,711,322

PHONOGRAPH STYLUS SUPPORT

Filed Oct. 29, 1949

Inventor:
Roy Dally,
by Merton D. Moore
His Attorney.

2,711,322
Patented June 21, 1955

2,711,322

PHONOGRAPH STYLUS SUPPORT

Roy Dally, Liverpool, N. Y., assignor to General Electric Company, a corporation of New York Application October 29, 1949, Serial No. 124,409

8 Claims. (Cl. 274—38)

Figure 1:
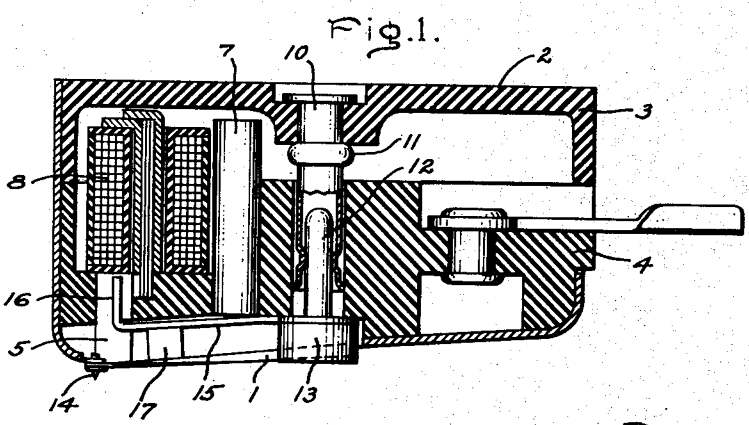

My invention relates to phonograph pickup apparatus, and, more particularly, to phonograph pickup apparatus which employs a cantilever-type of stylus support. It is a primary object of my invention to provide an improved type of and construction for a cantilever stylus support.

In the transducers of present day phonograph pickup apparatus, it is customary to employ a longitudinally extending stylus supporting member of substantial length which is secured to the pickup at one end and carries a record engaging stylus at the other end. Such a cantilever-type of stylus support is particularly adapted for use in phonograph pickups as it allows considerable vertical movement of the stylus. Such vertical movement is necessary to take care of the up and down movement of the "pinch effect" caused by certain portions of the record groove.

The cantilever stylus support of certain prior apparatus has comprised a ribbon-like flexible cantilever having a sharp twist in the center section thereof so as to provide compliance in both the lateral and vertical directions. Lateral compliance is necessary to allow the free end to follow the lateral undulations of the record groove and vertical compliance is necessary to allow the free end to move up and down under the influence of "pinch effect" without causing the stylus to jump out of the record groove. However, in these constructions, mechanical resonance of certain portions of the stylus support may occur at frequencies within the reproducing range of the pickup. Such mechanical resonances may cause improper tracking and distortion in reproduction. While such mechanical resonances may be reduced by the use of suitable damping material, damping material introduced losses in the system because it acts as a resistance to mechanical motion. The use of damping material also reduces the flexibility, or compliance, so that the stylus may not operate properly and distortion and increased wear of stylus tip and record may result.

It is an object of my invention, therefore, to provide a new and improved cantilever-type stylus support in which mechanical resonance is substantially reduced.

It is a further object of my invention to provide a new and improved cantilever-type stylus support in which distortion and wear of the stylus tip and record is substantially reduced.

It is another object of my invention to provide a new and improved cantilever-type stylus support in which the damping material necessary to reduce mechanical resonance effects thereof is substantially reduced.

Briefly, in accordance with one phase of my invention, there is provided a cantilever-type stylus support, the captive end of which is adapted to be secured in a phonograph pickup. The support is provided with a resilient ribbon-like intermediate portion which extends in a gradual spiral from the captive end of the support to the free end thereof, the free end portion of the support having a record engaging stylus positioned thereon. The intermediate portion of the support is of sufficient length to give a predetermined lateral and vertical compliance of the free end portion of the support with respect to the captive end portion thereof. By such construction, successive longitudinal elements of the intermediate portion of the support lie in successively different planes so that the successive longitudinal elements of the intermediate portion of the cantilever do not vibrate in unison to produce a particularly objectionable mechanical resonance. However, vertical and lateral compliance is maintained by the use of the reed-like ribbon-type structure.

Figure 2:
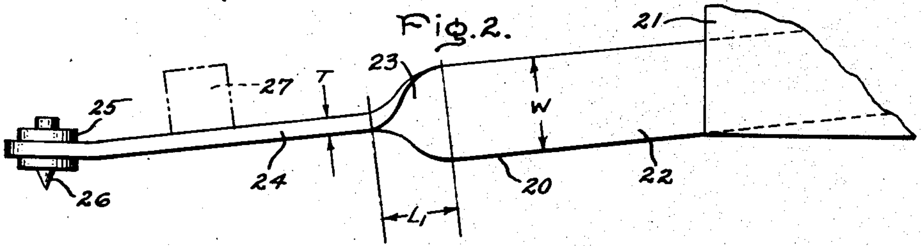
Figures 3, 4:
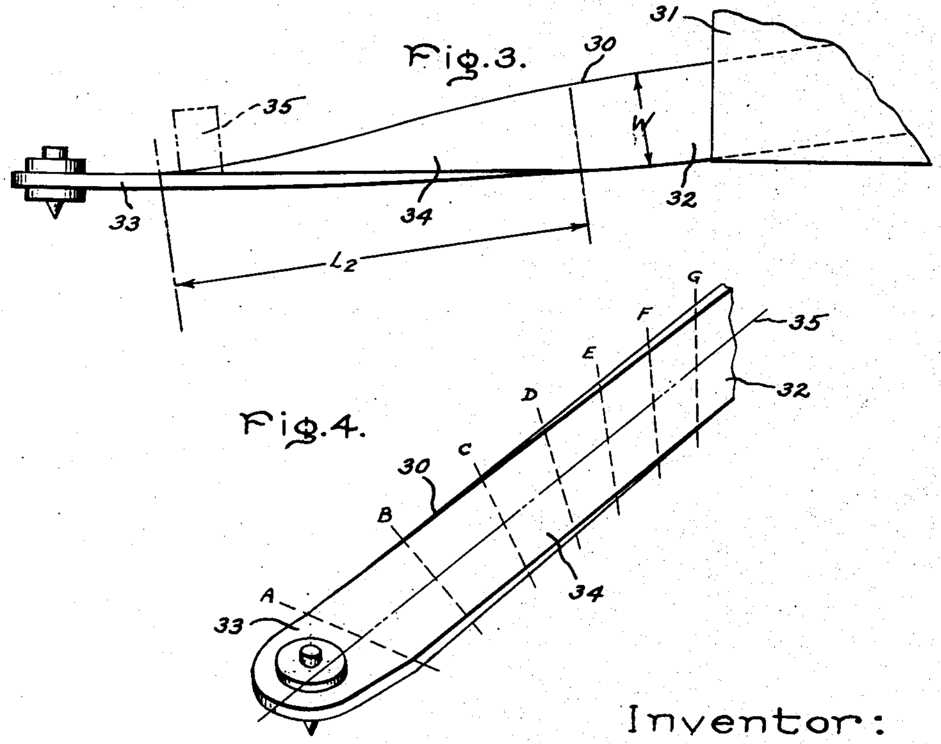

The features of my invention, which I believe to be novel, are set forth with particularity in the appended claims. My invention itself, however, both as to its organization and method of operation, together with further objects and advantages thereof, may best be understood by reference to the following description taken in connection with the accompanying drawing, in which Fig. 1 is a sectional side elevational view of a phonograph pickup wherein my improved type of stylus support may be employed; Fig. 2 is a side elevational view of a cantilever-type stlyus support of prior art construction; Fig. 3 is a side elevational view of a cantilever-type stylus support constructed in accordance with the principles of my invention; and Fig. 4 is a perspective view of the cantilever-type support of Fig. 3.

Referring now to Fig. 1 of the drawing, there is therein illustrated a cantilever-type stylus support which is constructed in accordance with the principles of my invention and is indicated generally at 1. The stylus support 1 is shown in operative position within a phonograph pickup apparatus which is indicated generally at 2. The phonograph pickup 2, which may be of any well known type, is shown as a variable reluctance type of phonograph pickup which employs a removable stylus, of the type disclosed and claimed in Patent 2,554,208, issued May 22, 1951, to Eric O. Peterson and Carroll R. Miner, which was filed on April 2, 1948 and which is assigned to the same assignee as my present invention. The phonograph pickup 2 comprises a pair of interfitting molded parts 3, 4 which enclosed the electric current producing portions of the phonograph pickup. The parts 3, 4 are held in assembled relation by means of a replaceable stylus assembly. The electric current producing portion of the pickup comprises a pair of pole pieces 5 which are arranged on opposite sides of the cantilever type stylus support 1 at the free end thereof, so that as the stylus is moved laterally in engagement with the phonograph record to be reproduced, the flux in an associated magnetic path is varied in accordance with the lateral variations of the stylus. Magnetic flux between pole pieces 5 is provided by a permanent magnet 7. A pair of coils 8 associated with the magnetic structure are utilized to produce electric currents the frequency components of which vary in accordance with the variations of the vibrations of the free end of the stylus support 1.

A removable stylus assembly is provided, this assembly comprising a tubular eyelet 10 which is attached to the cover member 3 by passing the eyelet through an aperture in cover 3 and flaring over the upward end 11 of the eyelet. The lower portion of the eyelet 10 is adapted to receive and firmly hold a post 12 of the removable stylus assembly. The lower portion of post 12 is provided with an enlarged head 13 which engages the lower surface of base member 4. The enlarged head portion 13 is provided with a slot in the lower surface thereof so as to receive the captive end portion of the cantilever-type stylus support 1. The other end of support 1 is provided with a record engaging stylus 14.

To assure that the free end of the cantilever type stylus support 1 is positioned substantially mid-way between pole pieces 5 there is provided a guide 15 which is spaced from and arranged parallel with the arm 1. At one end, guide 15 is adapted to slide over post 12 and to be secured thereto as by soldering or the like. At the other end, the guide 15 has a vertically extending portion 16 which extends between pole pieces 5 and is of a width substantially equal to the distance between the pole pieces. A small block 17 of suitable damping material, such as cellulose nitrate plastic or the like, may be positioned between guide 15 and the free end of support arm 1, the amount of such damping material being substantially reduced by use of the present invention, as will be described more fully hereinafter.

In considering the operation of the phonograph pickup as a unit, reference may be had to the aforementioned application for a description of the detailed operation thereof. However, for purposes of the present description of my improved cantilever type stylus support, it may be stated that the free end portion of arm 1 is centered in the air gap between pole pieces 5 and when the stylus 14 is vibrated by engagement with the groove of a sound record, the vibrations of the stylus produce corresponding changes in the flux passing through the portions of the yokes and laminations between the coils 8. When the stylus is in its mid-position substantially the same amount of flux passes through both cores. However, as soon as the stylus is diplaced towards one of the cores, a greater amount of flux flows in that core than the other, there being an increase in the flux in one core and a decrease in the other. It will thus be seen that the changes in flux through the two cores are in opposite directions, one increasing and the other decreasing. Due to the fact that stylus support 1 is of substantial length, the free end portion thereof possesses sufficient vertical and lateral compliance so as to follow faithfully the lateral movements of the sound track, and also the vertical movements due to the pinch effect thereof.

Referring now more particularly to the cantilever-type stylus support, it is evident that the vibrating arm may have points of mechanical resonance which will be excited by the vibrations of the free end thereof so as to produce distortion and improper tracking of the sound groove. In order to illustrate more clearly the way in which such objectionable mechanical resonances may come about, there is illustrated in Fig. 2 a cantilever type stylus support which is constructed according to prior art arrangements. The cantilever support, which is indicated generally at 20, is illustrated as being supported at one end in a base member 21, and is in the form of a ribbon of substantial width W as compared to the thickness T thereof. The support may be of suitable magnetic and resilient material, such as, for example, tool steel, or the like.

The cantilever arm 20 comprises a vertically extending portion 22 adjacent the captive end of the arm, it being understood that the captive end of the arm 20 is secured in a vertical slot within the base member 21. At an intermediate point the arm 20 is provided with a sharp twist 23, over a short portion of length $L_1$, so that the following section 24 of the arm comprises a substantially horizontal section. At the extremity of the horizontal section 24, there is provided a boss or collar 25 within which is positioned a reproducing stylus 26. The stylus 26 is of a semi-permanent type and may comprise, for example, a jewel such as a sapphire. It is evident that the horizontal section 24 of the stylus support 20 possesses a high ratio of vertical to horizontal compliance, due to the ribbon-like construction thereof. It is also evident that the vertically extending section 22 possesses a high ratio of lateral to vertical compliance for the same reason. The vertical compliance of portion 24 is necessary so that the stylus 26 may have substantial freedom of vertical movement so as to accommodate the vertical movements due to pinch effect without causing the stylus to jump out of the record groove. Also, the lateral compliance provided by the portion 22 is necessary so that the stylus 26 may accurately track the lateral variations in the sound groove. However, in such constructions, the compliant sections 22, 24 of the support 20 may have mechanical resonances at particular frequencies which fall within the frequency range which is to be reproduced. Such mechanical resonance is due, in part at least, to the fact that the individual sections 22, 24 of the support 20 are of substantial area and are free to vibrate as a unit. When mechanical resonances of the various elements of the support occurs, substantial tone distortion is introduced due to the fact that the mechanical resonances override the vibrations of the member which are caused by the record groove with consequent distortion and loss of tracking ability.

While the mechanical resonance effects of the horizontal and vertical portions of the support 20 may be reduced by providing a suitable block of damping material, which has been indicated at 27 in the drawing, the introduction of such damping material reduces the compliance of the support. Such reduced compliance interferes with tracking ability at an optimum vertical pressure and the interference with tracking ability causes distortion and increased wear of the stylus tip and record.

In order to eliminate mechanical resonance of particular planar elements of the longitudinally extending stylus support, I provide a cantilever-type stylus support such as is illustrated in detail in Fig. 3. The cantilever support, which is indicated generally at 30 is again in the form of a ribbon of substantial width W as compared with the thickness T thereof, and is of suitable resilient material, such as for example, tool steel or the like. The captive end portion of the support 30 is illustrated as being secured in a vertically extending groove within a base member 31. However, in my improved cantilever-type stylus support, the cantilever arm extends in a gradual spiral from a substantially vertical plane section 32 adjacent the base member 31, to a horizontally extending plane section 33, which is adjacent the free end of the cantilever arm. Due to the fact that the spiral configuration of the arm 30 extends for substantially more than half of the supported length thereof, the cantilever arm acts as a reed of uniform mass. Where as in the case of the sharply-twisted arm 20 in Fig. 2, the length $L_1$ of the twisted portion is less than its width W, in the case of the arm 34 of Fig. 3, the gradually twisted helical portion has a length $L_2$ which is substantially greater than its width W. Inasmuch as successive longitudinal elements of the intermediate portion 34 of the support arm are positioned in different planes, no individual mechanical resonance of particular sections of the support is experienced. As a result a substantially smaller amount of damping material 35 may be employed with my improved type of cantilever support, so that better frequency response is obtained and the frequency range of reproduction is substantially increased.

In order more clearly to illustrate the construction of my improved cantilever-type stylus support, and in order to investigate the mechanical resonant effect of successive longitudinal sections thereof, there is illustrated in Fig. 4, a perspective view of my improved cantilever-type stylus support. In Fig. 4 it is apparent that successive longitudinal elements of the intermediate portion 34 of the support arm lie in successive planes, which planes progressively rotate about the longitudinal axis 35 of the support arm 30. For example, the cross sectional element taken along the dotted line A will lie in a substantially horizontal plane. However, a longitudinally successive cross-sectional element taken along the line B will lie in a plane which is rotated about the longitudinal axis 35 by an amount which is dependent upon the separation of lines A and B. Likewise, progressive longitudinal elements lie in planes which progressively rotate about the longitudinal axis of the support. By such construction, no substantial portion of the support member lies in a common plane, so that mechanical resonance within the frequency band to be reproduced is substantially eliminated.

While I have indicated my cantilever type stylus support as being utilized in a removable stylus unit type of phonograph pickup, it is evident that the cantilever type support arm may be employed in many other types of phonograph pickups. For example, my improved cantilever type stylus support may be utilized in electromechanical transducer units which may comprise several slabs of Rochelle salt crystal which are cemented together to form a twister unit. In such case, the current generator is at the captive end of the stylus support arm rather than at the free end of the arm as in the case of the variable reluctance type pickup illustrated in Fig. 1. Also in situations wherein a crystal type generator is employed it will be understood that the stylus support arm arm need not be of magnetic material such as is required for variable reluctance type phonograph pickup units.

While the present invention is described by reference to a particular embodiment thereof, it will be understood that numerous modifications may be made by those skilled in the art without actually departing from the invention. I, therefore, aim in the appended claims to cover all such variations as come within the true spirit and scope of the foregoing disclosure.

What I claim as new and desire to secure by Letters Patent of the United States is:

1. A cantilever-type stylus support comprising a mounting member arranged to be secured in fixed relation to a phonograph pickup head, a flat metal strip having a captive end secured rigidly to said member in a first plane and a free end lying in a second, transverse plane, said first plane and said transverse plane extending substantially longitudinally of said strip in the same general direction, said strip having an intermediate helical section spiralling smoothly between said planes, said helical section having a length substantially greater than the greatest transverse dimensions of said strip and equal to more than half the total unsupported length of said strip, a phonograph stylus, and means securing said stylus to said strip near said free end, said stylus being adapted to be vibrated by the sound track of a phonograph record substantially in said second plane.

2. A quick-detachable cantilever-type stylus support comprising a plug-in mounting member arranged to be secured in fixed relation to a phonograph pickup head, a flat metal strip having a captive end secured rigidly to said member in a first plane and a free end lying in a second, transverse plane, said first plane and said transverse plane extending substantially longitudinally of said strip in the same general direction, said strip having an intermediate helical section spiralling smoothly between said planes, said helical section having a length substantially greater than the greatest transverse dimension of said strip and equal to more than half of the total unsupported length of said strip, a phonograph stylus, and means securing said stylus to said strip near said free end, said stylus being adapted to be vibrated by the sound track of a phonograph record substantially in said second plane.

3. A cantilever-type stylus support comprising a resilient, ribbon-like, cantilever arm having a captive end portion adapted to be rigidly secured in a pickup head and a gradually twisted intermediate portion extending in a smooth 90° spiral from said captive end portion to a free end portion, said intermediate portion being twisted about an axis extending generally through said two end portions and comprising more than half of the total unsupported length of said arm, said intermediate portion extending over a length substantially greater than the greatest transverse dimension of said arm, and a record engaging stylus positioned on said arm adjacent said free end.

4. A removable cantilever-type stylus support comprising a plug-in mounting pin adapted to be secured in a pickup head, a resilient, ribbon-like cantilever stylus arm, said arm having one end rigidly affixed to said pin and having a gradually twisted intermediate portion extending in a smooth 90° spiral from said end to a free end, said intermediate portion being twisted about an axis extending generally through said two end portions and comprising more than half of the total unsupported length of said arm, said intermediate portion extending over a length substantially greater than the greatest transverse dimension of said arm, and a record engaging stylus positioned on said arm adjacent said free end, said intermediate portion having a length sufficient to give a predetermined lateral and vertical compliance of said free end with respect to said rigid end.

5. A removable cantilever-type stylus support comprising a resilient, ribbon-like, cantilever arm having a plane end portion adapted to be secured to a pickup head in a generally vertical plane and a gradually twisted intermediate portion, said intermediate portion extending from said flat end portion in a smooth spiral and terminating in a generally horizontal plane section adjacent the free end portion thereof, said free end portion being provided with said record engaging stylus, said twisted intermediate portion being twisted about an axis extending generally through said two end portions and comprising substantially more than half the total unsupported length of said arm, said intermediate portion extending over a length substantially greater than the greatest transverse dimension of said arm, and being of sufficient length with respect to said vertical and said horizontal end portions whereby there is provided a predetermined degree of lateral and vertical compliance of said stylus with respect to the end portion of said cantilever arm that is adapted to be secured to a pickup head.

6. A cantilever-type stylus support comprising a mounting member adapted to be secured tightly within a recess in a pick-up head, a resilient, ribbon-like cantilever stylus arm, said arm having one end rigidly affixed to said member and having a helical intermediate portion extending from said end and terminating in a free end, said helical intermediate portion comprising a twist in said ribbon-like arm formed about an axis extending generally through said two ends, and a record engaging stylus positioned on said arm adjacent said free end, successive longitudinal elements of said intermediate portion lying in successive planes which progressively rotate about the longitudinal axis of said intermediate portion, whereby each of said successive elements is mechanically resonant at a frequency substantially above the frequency range of said pickup, said helical intermediate portion extending over more than half of the total unsupported length of said arm, said intermediate portion extending over a length substantially greater than the greatest transverse dimension of said arm and being of sufficient length to provide a predetermined lateral and vertical compliance of said free end with respect to said rigid end.

7. In a phonograph pickup head of the type wherein the mechanical activity of a record engaging stylus is sensed by magnetic means for translation into corresponding electrical energy, the improvement comprising a cantilever type stylus support at least a portion of which is of magnetic material, said support comprising a resilient, ribbon-like, cantilever arm having a captive end portion adapted to be substantially rigidly secured in a pickup head and a free end portion provided with a record engaging stylus, said captive end portion including a flat, generally vertical section, said free end portion including a flat, generally horizontal section, the intermediate portion of said cantilever arm being gradually twisted about an axis extending generally through said two end portions, said intermediate portion comprising more than half of the unsupported length of said arm and extending over a length substantially greater than the greatest transverse dimension of said unsupported length, whereby there is provided a predetermined degree of lateral and vertical compliance between the free end of said stylus support and the secured end of said stylus support.

8. A stylus support as set forth in claim 7 wherein damping means are provided for the free end portion thereof.

References Cited in the file of this patent

UNITED STATES PATENTS

| | | |
|---|---|---|
| 602,453 | Jones | Apr. 19, 1898 |
| 1,142,883 | Jones | June 15, 1915 |
| 1,160,146 | Dayan | Nov. 16, 1915 |
| 1,185,266 | Vesey | May 30, 1916 |
| 1,349,205 | Hughes | Aug. 10, 1920 |
| 2,239,717 | Hunt et al. | Apr. 29, 1941 |
| 2,426,061 | Snepvangers | Aug. 19, 1947 |
| 2,499,196 | Mencke | Feb. 28, 1950 |
| 2,554,208 | Peterson et al. | May 22, 1951 |
| 2,601,988 | Chorpening et al. | July 1, 1952 |